(12) United States Patent
Pittl et al.

(10) Patent No.: US 11,649,904 B2
(45) Date of Patent: May 16, 2023

(54) VALVE UNIT, FILTER HEAD FOR A VALVE UNIT, AND FILTER SYSTEM

(71) Applicant: MANN+HUMMEL GmbH, Ludwigsburg (DE)

(72) Inventors: Michal Pittl, Mrakotin (CZ); Martin Weindorf, Kornwestheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 17/683,584

(22) Filed: Mar. 1, 2022

(65) Prior Publication Data

US 2022/0282796 A1 Sep. 8, 2022

(30) Foreign Application Priority Data

Mar. 5, 2021 (DE) ...................... 10 2021 105 373.0

(51) Int. Cl.
*F16K 15/03* (2006.01)
*B01D 35/153* (2006.01)
*F02M 37/48* (2019.01)

(52) U.S. Cl.
CPC ............ *F16K 15/03* (2013.01); *B01D 35/153* (2013.01); *B01D 2201/167* (2013.01); *B01D 2201/301* (2013.01); *F02M 37/48* (2019.01); *F16K 15/031* (2013.01); *Y10T 137/7887* (2015.04); *Y10T 137/7888* (2015.04); *Y10T 137/7891* (2015.04)

(58) Field of Classification Search
CPC ..... F16K 15/03; F16K 15/031; B01D 35/153; B01D 2201/167; B01D 2201/301; F02M 37/48; Y10T 137/7887; Y10T 137/7888; Y10T 137/7891
See application file for complete search history.

(56) References Cited

U.S. PATENT DOCUMENTS

| 2,000,883 A | 5/1935 | Cullen et al. |
| 2,598,216 A | 5/1952 | Bousky |
| 2,899,981 A * | 8/1959 | Binks ...................... F16L 55/04 |
| | | 138/46 |
| 2,908,287 A * | 10/1959 | Augustin ............ F04B 39/1073 |
| | | 137/856 |

(Continued)

FOREIGN PATENT DOCUMENTS

| CN | 1952358 A | 4/2007 |
| CN | 101084050 A | 12/2007 |

(Continued)

*Primary Examiner* — Daphne M Barry
*Assistant Examiner* — Frederick D Soski

(57) ABSTRACT

A valve unit has a plate-shaped valve body with a closure section and a connection section. The valve body has a cutout surrounded by a frame. The closure section has a closure tab that, beginning at a first fastening section at the frame, projects into the cutout. The connection section, beginning at a second fastening section at the frame, projects into the cutout and has a contact tab and a fastening point. The first and second fastening sections are arranged opposite each other at the frame along a longitudinal axis of the valve body. A filter head for the valve unit has a valve seat for a seal body of the closure section of the valve body. A fastening pin of the filter head fastens the connection section of the valve unit. A contact region of the filter head contacts a positioning region of the valve unit.

17 Claims, 5 Drawing Sheets

(56) References Cited

U.S. PATENT DOCUMENTS

| | | | | |
|---|---|---|---|---|
| 3,568,712 A * | 3/1971 | Rinehart | F04C 29/128 | 137/855 |
| 3,815,559 A * | 6/1974 | Anderson | F01L 3/205 | 123/73 V |
| 3,998,571 A * | 12/1976 | Falke | F16K 15/16 | 137/512 |
| 4,067,302 A * | 1/1978 | Ehrlich | F02B 25/20 | 123/73 AA |
| 4,076,047 A * | 2/1978 | Akahori | F01L 3/205 | 137/856 |
| 4,193,424 A * | 3/1980 | Hrabal | F16K 15/16 | 417/571 |
| 4,471,812 A * | 9/1984 | Bertsch | F16K 17/0453 | 137/527.6 |
| 4,487,662 A * | 12/1984 | Fischbeck | F16K 99/0001 | 347/85 |
| 4,539,108 A | 9/1985 | Izutani et al. | | |
| 4,696,263 A * | 9/1987 | Boyesen | F01L 3/205 | 123/73 V |
| 4,946,451 A * | 8/1990 | Cianci | A61F 5/4404 | 604/350 |
| 4,954,252 A | 9/1990 | Griffin et al. | | |
| 4,972,765 A * | 11/1990 | Dixon | B60R 13/0892 | 137/855 |
| 4,976,284 A * | 12/1990 | Hovarter | F04B 27/1009 | 137/856 |
| 5,035,050 A * | 7/1991 | Cowen | F04C 29/128 | 29/428 |
| 5,140,748 A * | 8/1992 | Kandpal | F04B 39/1073 | 417/571 |
| 5,143,027 A * | 9/1992 | Bergeron | F01L 3/205 | 123/73 V |
| 5,158,539 A * | 10/1992 | Kolff | A61M 1/3667 | 604/247 |
| 5,194,038 A * | 3/1993 | Klomhaus | B60H 1/249 | 454/162 |
| 5,197,867 A * | 3/1993 | Kandpal | F04B 39/1073 | 417/571 |
| 5,203,686 A * | 4/1993 | Scheldorf | F04C 29/128 | 418/270 |
| 5,209,260 A * | 5/1993 | Baek | F04B 39/1073 | 137/856 |
| 5,228,468 A * | 7/1993 | Kapadia | F04B 53/1087 | 137/1 |
| 5,355,910 A * | 10/1994 | Gies | F16K 15/144 | 454/162 |
| 5,370,156 A * | 12/1994 | Peracchio | F04C 29/128 | 137/856 |
| 5,406,976 A * | 4/1995 | Bekki | F16H 61/0009 | 137/513.3 |
| 5,413,142 A * | 5/1995 | Johnson | A61F 7/10 | 137/515.5 |
| 5,601,055 A * | 2/1997 | Haines | F01B 3/0038 | 123/70 V |
| 5,609,476 A * | 3/1997 | Kim | F04B 39/1073 | 417/447 |
| 5,839,472 A * | 11/1998 | Shintoku | F04C 29/128 | 137/856 |
| 5,848,615 A * | 12/1998 | Conti | F04B 53/1042 | 137/856 |
| 5,885,064 A * | 3/1999 | McCoy | F04B 39/1086 | 417/571 |
| 5,899,218 A * | 5/1999 | Dugan | F15C 5/00 | 137/527 |
| 6,006,786 A * | 12/1999 | Ito | F16K 15/162 | 137/856 |
| 6,139,291 A * | 10/2000 | Perevozchikov | F04C 29/128 | 137/856 |
| 6,227,825 B1 * | 5/2001 | Vay | F04B 39/1073 | 137/15.19 |
| 6,235,192 B1 | 5/2001 | Melfi et al. | | |
| 6,336,795 B1 * | 1/2002 | Yamada | F04B 39/1073 | 137/856 |
| 6,523,571 B1 * | 2/2003 | Kim | F04B 39/1073 | 137/856 |
| 7,083,400 B2 * | 8/2006 | Possamai | F04B 39/1066 | 417/571 |
| 8,096,791 B2 * | 1/2012 | Bortoli | F16K 15/16 | 417/571 |
| RE43,289 E * | 4/2012 | Bowers | A62B 18/10 | 128/205.24 |
| 9,091,359 B1 * | 7/2015 | Gassaway | F16K 15/031 | |
| 9,360,001 B2 * | 6/2016 | Miranda | F04B 39/1073 | |
| 9,534,359 B2 * | 1/2017 | Peyton | E03B 9/16 | |
| 9,920,848 B2 * | 3/2018 | Rosa | F16K 15/144 | |
| D822,822 S * | 7/2018 | Arceno | D23/386 | |
| 11,306,834 B1 * | 4/2022 | Chase | F16K 15/031 | |
| 2002/0119059 A1 * | 8/2002 | Sato | F04B 39/1073 | 417/571 |
| 2002/0157717 A1 | 10/2002 | Hong et al. | | |
| 2003/0005970 A1 * | 1/2003 | Rim | F16K 15/031 | 137/856 |
| 2003/0020286 A1 * | 1/2003 | McHenry | F16K 15/147 | 292/336.3 |
| 2003/0041818 A1 * | 3/2003 | Cobb, Jr. | F02M 37/0023 | 123/73 V |
| 2003/0085532 A1 * | 5/2003 | Spiegl | F04B 39/1073 | 277/650 |
| 2004/0109778 A1 * | 6/2004 | Shimizu | F04B 39/1073 | 417/569 |
| 2004/0161352 A1 * | 8/2004 | Nieter | F04B 39/1066 | 417/569 |
| 2004/0187941 A1 * | 9/2004 | Seder | A61M 16/0468 | 137/855 |
| 2004/0250863 A1 * | 12/2004 | Atkeson | F16K 15/031 | 137/855 |
| 2004/0261776 A1 | 12/2004 | Knaus et al. | | |
| 2005/0079081 A1 * | 4/2005 | Nieter | F04B 39/1073 | 417/567 |
| 2005/0175490 A1 * | 8/2005 | Seto | F16K 15/16 | 417/559 |
| 2005/0199845 A1 * | 9/2005 | Jones | F16K 15/035 | 251/129.06 |
| 2006/0016483 A1 | 1/2006 | Crisp | | |
| 2006/0076069 A1 * | 4/2006 | Haamer | B65D 81/3453 | 426/118 |
| 2006/0173420 A1 * | 8/2006 | Fangrow, Jr. | A61M 39/24 | 604/247 |
| 2006/0237185 A1 * | 10/2006 | Peric | G05D 23/121 | 165/283 |
| 2007/0235088 A1 * | 10/2007 | Klein | F16K 15/038 | 137/512.15 |
| 2009/0028733 A1 | 1/2009 | Duwel | | |
| 2009/0071551 A1 * | 3/2009 | Chalich | F16K 15/03 | 137/526 |
| 2010/0050962 A1 | 3/2010 | Hoffmann et al. | | |
| 2011/0041930 A1 * | 2/2011 | Kiezulas | F16K 15/031 | 137/527 |
| 2012/0036993 A1 * | 2/2012 | Nieter | F16K 15/031 | 91/468 |
| 2012/0168658 A1 * | 7/2012 | Insley | F16K 15/031 | 251/298 |
| 2012/0204333 A1 * | 8/2012 | Serin | E03C 1/1225 | 4/211 |
| 2012/0207632 A1 * | 8/2012 | Usui | F04B 53/1037 | 417/440 |
| 2012/0313024 A1 * | 12/2012 | Eiermann | F16K 15/144 | 251/294 |
| 2013/0118622 A1 | 5/2013 | Patzold et al. | | |
| 2015/0198343 A1 * | 7/2015 | Huber | E03F 5/042 | 454/358 |
| 2016/0010756 A1 * | 1/2016 | Fallon | F16K 27/0227 | 137/12 |
| 2016/0152114 A1 * | 6/2016 | Yamamoto | B60H 1/249 | 454/162 |
| 2016/0201308 A1 * | 7/2016 | Van Baar | F16K 15/147 | 137/247.11 |

(56) References Cited

U.S. PATENT DOCUMENTS

| | | | |
|---|---|---|---|
| 2016/0252094 A1* | 9/2016 | Hayashi | F04C 18/322 |
| | | | 137/855 |
| 2016/0317779 A1* | 11/2016 | Barraza | A61M 16/206 |
| 2017/0114911 A1* | 4/2017 | Hiratsuka | F16K 15/148 |
| 2017/0152958 A1 | 6/2017 | Akamatsu | |
| 2017/0343122 A1* | 11/2017 | Abouelleil | F16K 15/144 |
| 2017/0356441 A1* | 12/2017 | Rodrigues | F04B 39/1073 |
| 2018/0135630 A1* | 5/2018 | Yahaba | F04C 23/001 |
| 2019/0186345 A1* | 6/2019 | Joyce | F02M 31/20 |
| 2020/0166032 A1* | 5/2020 | Inoue | F04C 29/12 |
| 2020/0208634 A1* | 7/2020 | Ueda | F04C 29/0035 |
| 2020/0289967 A1 | 9/2020 | Weindorf | |
| 2020/0392888 A1* | 12/2020 | Endo | F01P 5/12 |
| 2021/0310572 A1* | 10/2021 | Karino | F16K 1/2007 |

FOREIGN PATENT DOCUMENTS

| | | |
|---|---|---|
| DE | 1956259 A1 | 5/1971 |
| DE | 29605425 U1 | 6/1996 |
| DE | 19834140 A1 | 8/1999 |
| DE | 102005005473 A1 | 8/2006 |
| DE | 202005021795 U1 | 2/2010 |
| DE | 102020112696 A1 | 11/2021 |
| FR | 2814377 A1 | 3/2002 |
| GB | 1415406 A | 11/1975 |
| KR | 20080096236 A | 10/2008 |
| KR | 20090126984 A | 12/2009 |
| WO | 2010049199 A1 | 5/2010 |

* cited by examiner

VALVE UNIT, FILTER HEAD FOR A VALVE UNIT, AND FILTER SYSTEM

BACKGROUND OF THE INVENTION

The invention concerns a valve unit. The invention further concerns a filter head for a valve unit as well as a filter system with a filter head and a valve unit, in particular for liquid filtration.

DE 202005021795 U1 discloses a valve unit with a plate-shaped valve body and a closure tab that covers an opening. Components of this type are used as spring plate valves for gaseous or liquid media, for example, as vacuum valve or pressure relief valve.

SUMMARY OF THE INVENTION

It is an object of the invention to provide a valve unit that enables an improved seal-tightness of a valve and an improved pressure stability in blocking direction of the valve unit. This valve unit can be used in a series of different fluid systems in various applications, for example, in a filter system for fuel supply of an internal combustion engine.

A further object of the invention is to provide a filter head for a valve unit with improved seal-tightness and a pressure loss as minimal as possible.

A further object of the invention is to provide a filter system with a filter head and a valve unit with improved seal-tightness.

A further object of the invention is to provide a filter system with a pressure loss-optimized filter head and a valve unit with improved seal-tightness and an improved pressure stability in blocking direction of the valve unit, wherein the pressure stability in blocking direction is advantageous when filling the fuel system.

The aforementioned objects are solved according to an aspect of the invention with a valve unit, with a plate-shaped valve body that comprises a closure section and a connection section, wherein the valve body comprises a frame that surrounds a cutout in the valve body, wherein the closure section comprises a closure tab that, beginning at a first fastening section at the frame, projects into the cutout, wherein the connection section comprises a contact tab and, beginning at a second fastening section at the frame, projects into the cutout, and the connection section comprises at least one fastening point, and wherein the first fastening section and the second fastening section are arranged opposite each other at the frame along a longitudinal axis of the valve body.

According to a further aspect of the invention, the objects are solved by a filter head for a valve unit according to the invention, comprising a valve seat to be contacted by a seal body of a closure section of the valve unit, a fastening pin for fastening a connection section of the valve unit, as well as a contact region for a positioning region of the valve unit.

According to a further aspect of the invention, the objects are solved by a filter system with a housing in which a valve unit according to the invention and a filter head according to the invention are arranged.

Beneficial configurations and advantages of the invention result from the further claims, the description, and the drawing.

According to an aspect of the invention, a valve unit is proposed with a plate-shaped valve body that comprises a closure section and a connection section. The valve body comprises a frame that surrounds a cutout in the valve body. The closure section comprises a closure tab which, beginning at a first fastening section at the frame, projects into the cutout. The connection section comprises a contact tab and projects, beginning at the second fastening section at the frame, into the cutout. The connection section comprises at least one fastening point. The first fastening section and the second fastening section are arranged opposite each other at the frame along a longitudinal axis of the valve body.

Beneficially, the contact tab permits a beneficial deformation that generates a pretension for the closure tab. At the closure tab, a seal means is arranged that is provided for contact at the valve seat and that can be brought reliably into contact at the valve seat due to the pretension. In cases in which the valve unit after mounting is arranged as intended below the valve seat, an unfavorable lowering of the closure tab, for example, due to the effect of gravity, and thus a section-wise release of the seal means from the valve seat is avoided.

The fastening point can provide a form-fit and/or force-fit connection to a filter head, for example, a screw connection, a clamping connection, a weld connection or the like, with which the contact tab can be stably connected to the filter head.

According to a beneficial embodiment of the valve unit, the at least one fastening point of the connection section can be arranged on the longitudinal axis. Advantageously, a beneficial force ratio of levers formed by the tabs can be achieved.

According to a beneficial embodiment of the valve unit, the at least one fastening point can be embodied as a through opening. Optionally, the at least one fastening point can comprise a through opening embodied as a clamping element. By means of a clamping connection, the valve unit can be fastened substantially without a tool and without an additional fastening element to the filter head, for example, to a pin. A clamping connection in the manner of a securing disk can be provided where teeth point inwardly at the through opening and contact under tension the outer side of the pin.

According to a beneficial embodiment of the valve unit, the connection section can comprise at least one positioning region that, for example, is arranged on the longitudinal axis. This enables prevention of a rotation of the valve unit about the fastening point.

In an alternative embodiment, the positioning region can be arranged spaced apart from the longitudinal axis.

According to a beneficial embodiment of the valve unit, the positioning region can be embodied as a through opening. Optionally, the positioning region can be embodied as a through opening that extends in particular along the longitudinal axis as an elongated hole. Advantageously, the longer length extension of the elongated hole can be oriented in the direction of the longitudinal axis. This enables a compensation of tolerances as well as sufficient clearance for a desired deformation in case of a deflection of the connection section.

According to a beneficial embodiment of the valve unit, the valve body can be formed of metal. This enables a simple manufacture, for example, by means of stamping from sheet metal or by means of laser machining of sheet metal. Advantageously, the metallic closure tab of the closure section can form a stable carrier of a seal element.

According to a beneficial configuration of the valve unit, the closure section can comprise a seal body, in particular of an elastomer. Optionally, the closure body can comprise a seal body of an elastomer which is arranged at the closure tab or around the closure tab, in particular injection molded around. Material of the seal body can be advantageously molded over the closure tab. This enables a stably supported robust seal element that even withstands higher counter pressures in blocking direction as they occur when filling the fuel system with fuel.

According to a further aspect of the invention, a filter head for a valve unit is proposed. The valve unit comprises a plate-shaped valve body that comprises a closure section and a connection section. The valve body comprises a frame that surrounds a cutout in the valve body. The closure section comprises a closure tab that projects, beginning at a first fastening section at the frame, into the cutout. The connection section comprises a contact tab and projects, beginning at a second fastening section at the frame, into the cutout. The connection section comprises at least one fastening point. The first fastening section and the second fastening section are arranged opposite each other at the frame along the longitudinal axis of the valve body. The filter head comprises a valve seat to be contacted by a seal body of the closure section of the valve unit, a fastening pin for fastening the connection section of the valve unit, as well as a contact region for the positioning region of the valve unit.

Advantageously, the filter head can be designed such that, when the valve unit is mounted, a defined pretension of the closure section against the valve seat is automatically generated. This improves the seal tightness of the valve.

According to a beneficial embodiment of the filter head, the contact region can comprise a base for the positioning region of the valve unit which is projecting farther away from a surface which is facing, as intended, the valve unit in the mounted state than a base of the fastening pin at which the connection section in the contact region of its fastening point is resting as intended. In this way, the regions of the contact tab of the valve body which are in contact with the filter head are arranged at different levels so that a deformation of the contact tab is realized. The region of the contact tab which is closer to the fastening section with the frame of the valve body projects farther away from the surface of the filter head than the region that is closer to the free end of the contact tab. In this way, a beneficial pretension at the closure section and its closure tab can be generated.

According to a beneficial embodiment of the filter head, with the valve unit mounted as intended and valve seat closed, a closure tab of the closure section and a contact tab of the connection section can be deflected toward different sides of the frame. This enables a beneficial adjustment of contact forces and of the pretension of the closure section at the valve seat.

According to a further aspect of the invention, a filter system is proposed with a housing in which a valve unit and a filter head are arranged. The valve unit comprises a plate-shaped valve body which comprises a closure section and a connection section. The valve body comprises a frame which surrounds a cutout in the valve body. The closure section comprises a closure tab that, beginning at the first fastening section at the frame, projects into the cutout. The connection section comprises a contact tab and projects, beginning at a second fastening section at the frame, into the cutout. The connection section comprises at least one fastening point. The first fastening section and the second fastening section are arranged opposite each other at the frame along the longitudinal axis of the valve body. The filter head comprises a valve seat to be contacted by a seal body of the closure section of the valve unit, a fastening pin for fastening the connection section of the valve unit, as well as a contact region for the positioning region of the valve unit.

According to a beneficial configuration of the filter system, the latter can be provided for use as a prefilter in a fuel supply system. Advantageously, due to the pretension of the closure section, an improved seal-tightness of the valve unit can be achieved. Moreover, a beneficial minimal pressure loss can be obtained because the closure section can cover large diameters of flow channels. The diameter of the closure section can be adjusted simply to a desired valve seat upon manufacture of the valve body.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to meaningful further combinations.

DESCRIPTION OF PREFERRED EMBODIMENTS

Figure 1:
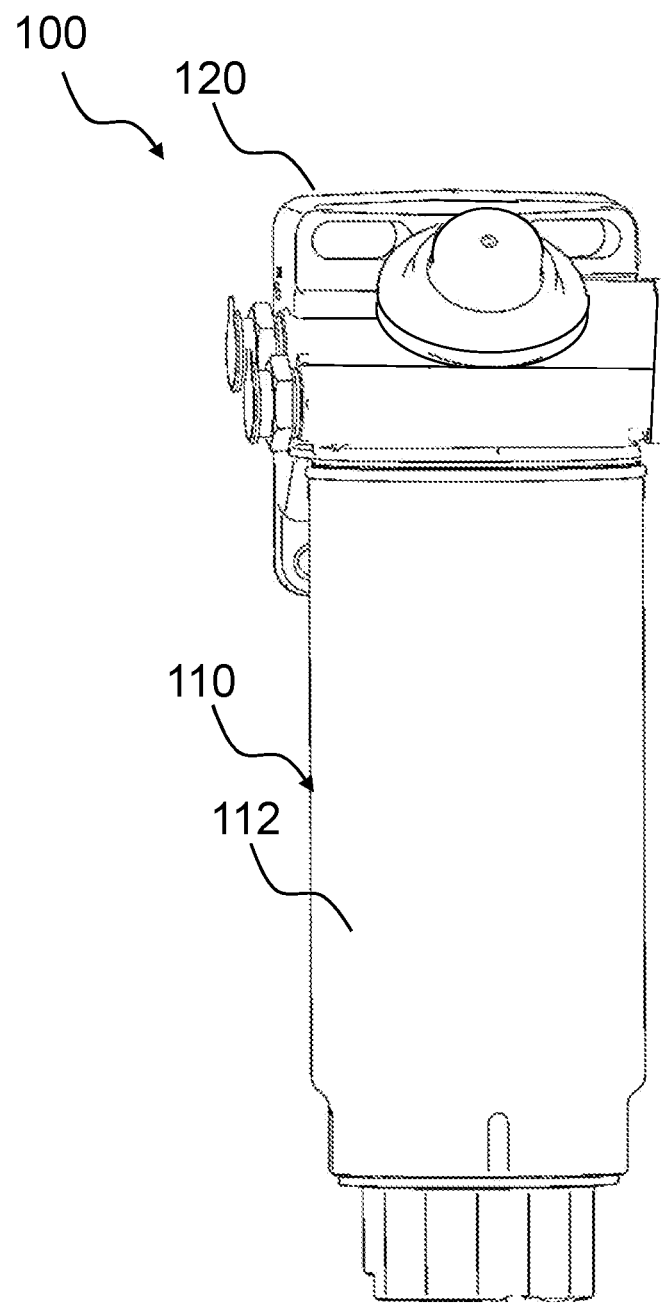
FIG. 1 shows a view of a filter system in form of a fuel prefilter with filter cup and filter head according to an embodiment of the invention.

In the Figures, same or same-type components are identified with same reference characters. The Figures show only examples and are not to be understood as limiting.

For explaining the invention, FIG. 1 shows an embodiment of a filter system 100 with a housing 110 comprising a filter cup 112 with exchangeable filter element (not illustrated) and a filter head 120. For exchange of the filter element, the filter cup 112 can be separated from the filter head 120. The filter system 100 can be provided, for example, as prefilter in a fuel supply system of a utility vehicle. Other fields of use are, for example, industrial machines and the like. Also, a use of the valve unit in other fluid systems in other fields of application can be provided.

Figure 2:
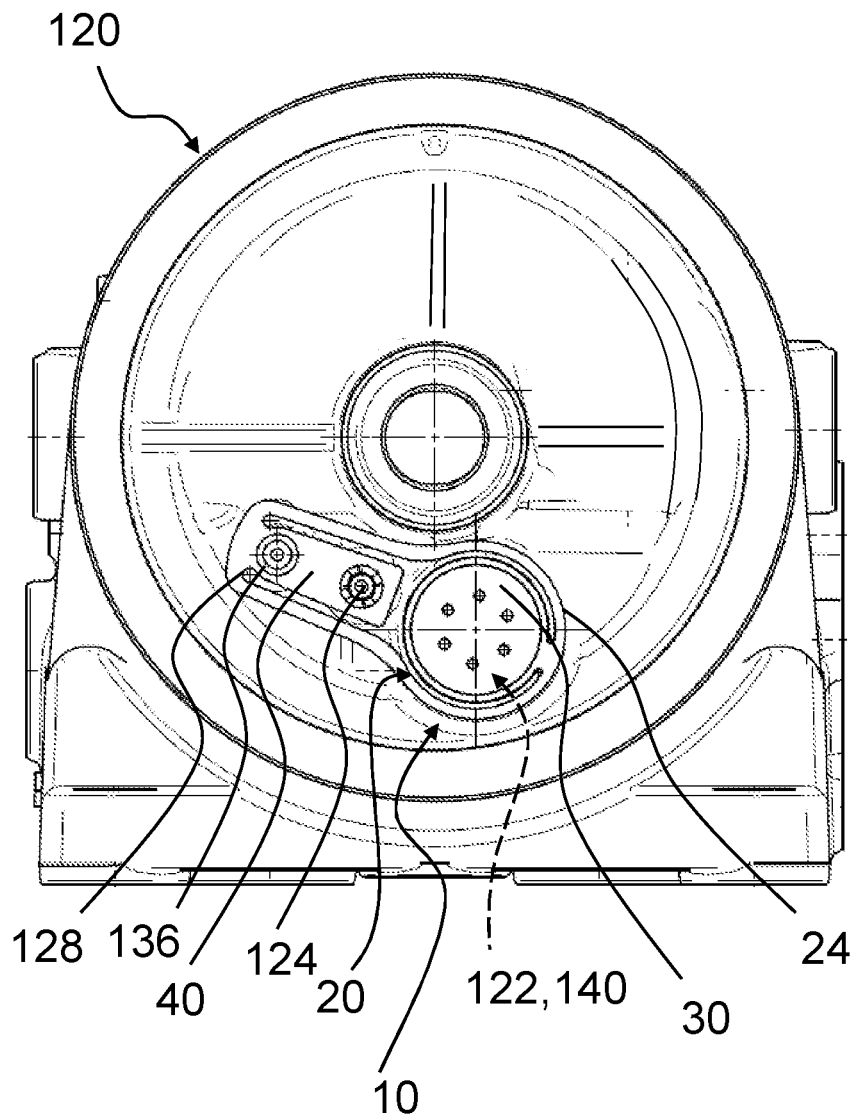
FIG. 2 shows a plan view of the filter head according to FIG. 1 with a valve unit according to an embodiment of the invention.

FIG. 2 shows a plan view of the filter head 120 according to FIG. 1 with a valve unit 10 according to an embodiment of the invention. The valve unit 10 comprises a plate-shaped valve body 20, for example, of sheet metal, that comprises a closure section 30 and a connection section 40. Closure section 30 and connection section 40 are surrounded by a frame 24.

The closure section 30 covers a valve seat 122, not visible in the Figure, at a passage to a fluid conduit 140, not visible, in the filter head 120. In the plan view, three further passages to fluid conduits can be seen which are not further identified. For a closed filter system 100 (FIG. 1), the valve unit 10, which here serves as a check valve in the filter system 100 (FIG. 1), opens when at one of the fluid conduits a suction is applied. The closure section 30 would open in downward direction in a filter system 100 according to FIG. 1.

In case of excess pressure or pressure compensation, the valve unit 10 is closed. The own weight of the closure section 30, acting downwardly in the mounted state, does not lift the latter off the valve seat 122.

The connection section 40 is connected to the filter head 120 wherein the valve unit 10 is secured at a fastening pin 124 of the filter head 120, in particular clamped, and is held in position at a pin 136 of the filter head 120.

Figure 3:
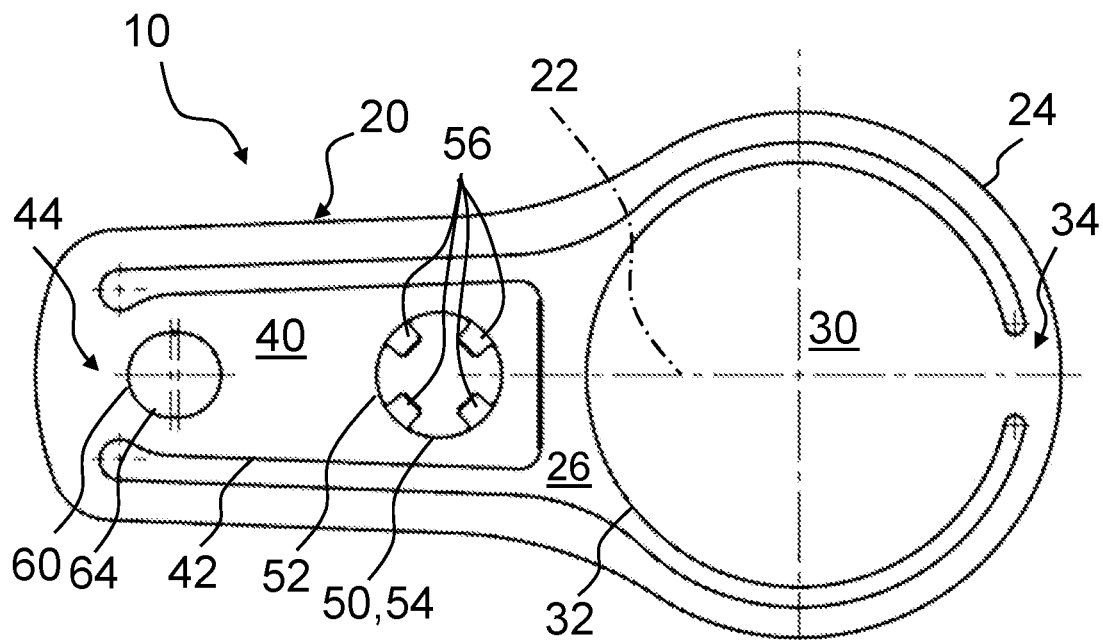
FIG. 3 shows a plan view of a valve body of a valve unit according to an embodiment of the invention.
Figure 4:
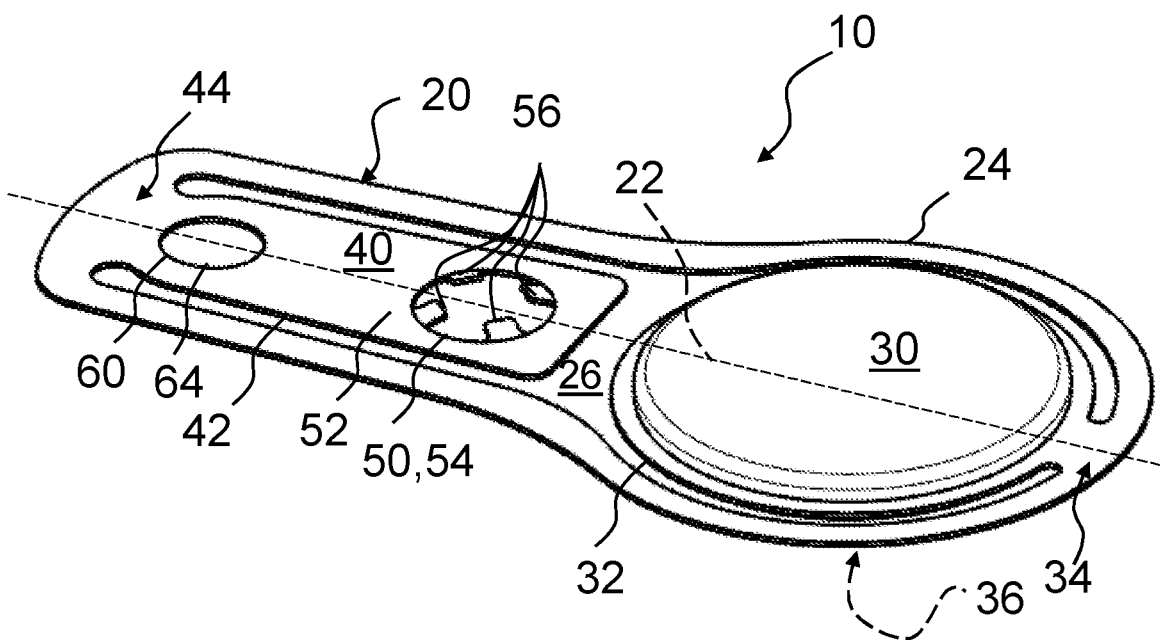
FIG. 4 shows a perspective view of a valve unit with a valve body according to FIG. 3.

FIG. 3 shows a plan view of a valve body 20 of a valve unit 10 according to an embodiment of the invention. FIG. 4 shows a perspective view of the valve unit 10 with a valve body 20 according to FIG. 3 with a closure section 30 injection-molded around by an elastomer.

The plate-shaped valve body 20 comprises a frame 24 that surrounds a cutout 26. The closure section 30 comprises a closure tab 32 which, beginning at a first fastening section 34 at the frame, projects into the cutout 26. The closure tab 32 is of a round circular shape in this embodiment.

The first fastening section 34 and the second fastening section 44 are arranged opposite each other at the frame 24 along a longitudinal axis 22 of the valve body 20.

The connection section 40 comprises a contact tab 42 that, beginning at a second fastening section 44 at the frame 24, projects into the cutout 26. The contact tab 42 is approximately of a rectangular shape in this embodiment.

The contact tab 42 comprises a fastening point 50 at which the valve unit 10, with the fastening region or contact region 52 surrounding the fastening point 50, can be fastened to the filter head 120. In this embodiment, the fastening point 50 is embodied as a through opening 54 which comprises inwardly pointing teeth 56. In this way, the valve unit 10 can be clamped on a corresponding fastening pin 124 (FIG. 2). The contact tab 42 comprises moreover a positioning region 60 with which the valve unit 10 can be positioned in a predetermined direction. The fastening point 50 and the positioning region 60 are arranged on the longitudinal axis 22.

The positioning region 60 is configured as a through opening 64 wherein the through opening 64 is embodied as an elongated hole that extends with its longer axis along the longitudinal axis 22. This enables a sufficient clearance in case of a deflection of the contact tab 42 in relation to the frame 24.

The closure tab 32 and the contact tab 42 can be deflected below or above the frame 24 and can act in the manner of leaf springs.

As can be seen in FIG. 4, the closure tab 30 can be provided with a material that forms a seal body 36 that is arranged in the Figure below the closure tab 32. Advantageously, the material can be injection molded around the closure tab 32.

Figure 5:
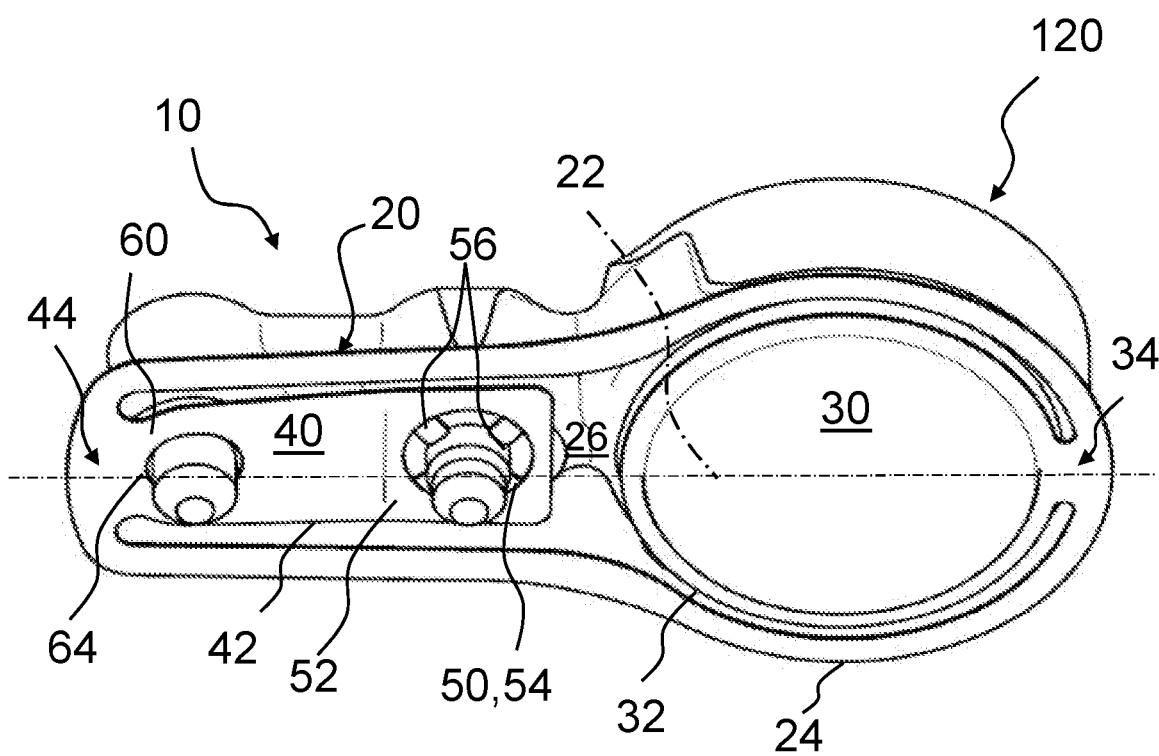
FIG. 5 shows a perspective view of a valve unit and a detail of the filter head according to FIG. 1 with valve unit.
Figure 6:
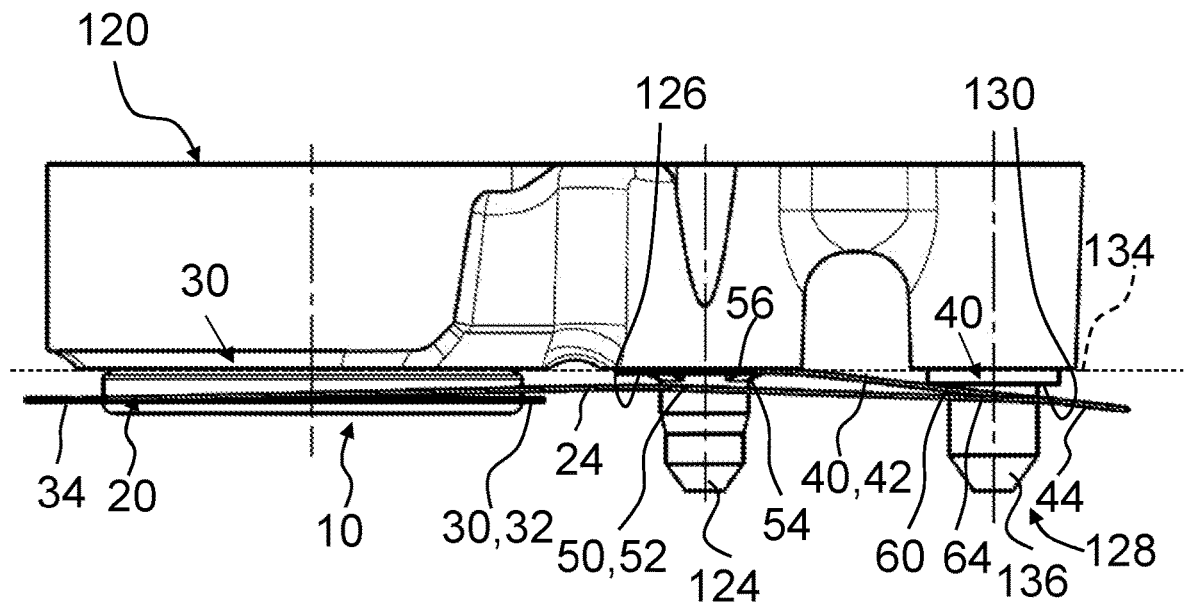
FIG. 6 shows a side view of the detail of the filter head with valve unit according to FIG. 5.
Figure 7:
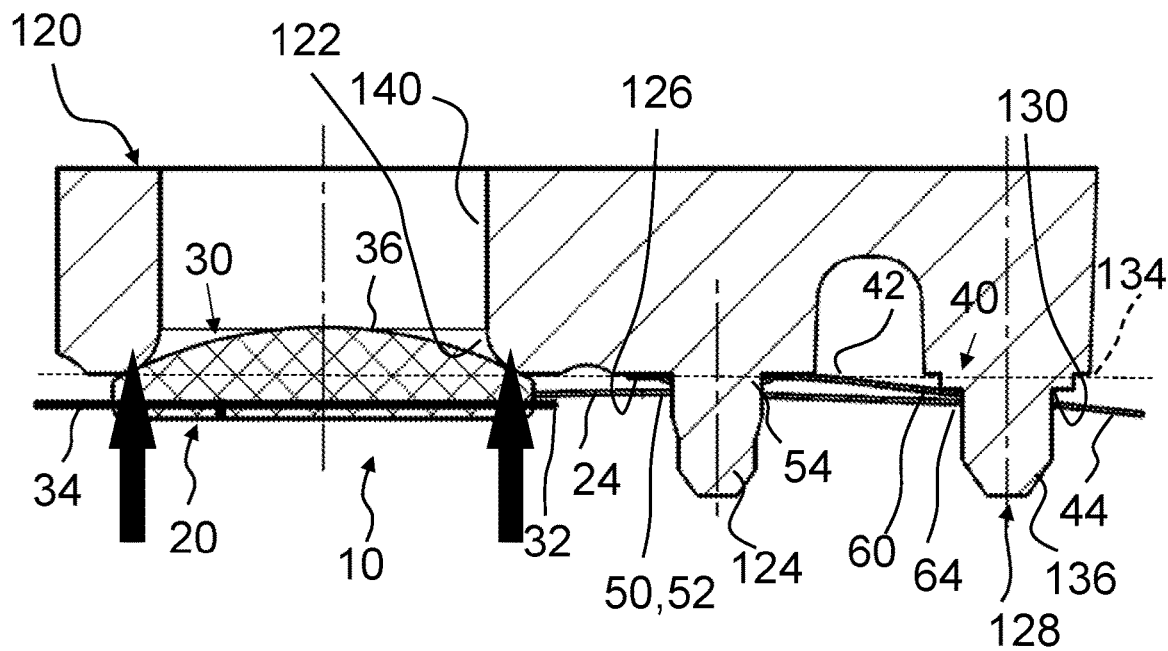
FIG. 7 shows a longitudinal section of the detail of the filter head with valve unit according to FIG. 5.

FIG. 5 shows a perspective view of a detail of the filter head 120 according to FIG. 2 with valve unit 10, while FIG. 6 shows a side view of the detail of the filter head 120 with valve unit 10 according to FIG. 5, and FIG. 7 shows a longitudinal section through the detail of the filter head 120 with valve unit 10 according to FIG. 5.

The filter head 120 comprises a fastening pin 124 at which the valve unit 10 is fastened by its contact tab 42 at the fastening point 50. The contact tab 42 of the valve unit 10 is positioned by means of the through opening 64 of its positioning region 60 at a pin 136 of the filter head 120.

In the region of the valve unit 10, the filter head 120 comprises a surface plane 134 which is symbolized in FIGS. 6 and 7 as a broken line. The fastening pin 124 has its base 126 in this surface plane 134 while the pin 136 has a base 130 that projects farther away from the surface plane 134. In this context, the valve unit 10 with its through opening 54 is pushed onto the fastening pin 124 such that the fastening region or contact region 52 contacts the base 126 of the fastening pin 124 of the filter head 120. On the other hand, a portion of the region of the contact tab 42 near the fastening section 44 is contacting the base 130 of the pin 136 which forms a contact region 128 so that the frame 24 in this contact region 128 projects farther away from the surface plane 134 than the contact region 52 of the contact tab 42. The contact tab 42 projects upwardly away from the frame 24. Due to the deformation of the contact tab 42, a pretension in the region of the closure section 30 or of the closure tab 32 is effected which, with its seal body 36, is contacting the valve seat 122 of the filter head 120 and closes the opening of a fluid conduit 140. The end face of the valve seat 122 is positioned also in the surface plane 134. Due to the pretension it can be achieved that the closure tab 32 does not drop downwardly due to the own weight of the closure tab 32 with seal body 36 and does not accidentally release the valve seat 122. The pretension is indicated with two upwardly projecting thick arrows at the closure tab 32.

Since the seal body 36 is arranged on the springy closure tab 32, it can contact and seal the valve seat 122 all around. As can be seen in FIG. 7, the closure tab 32 is parallel to the surface plane 134 and projects downwardly out of the frame 24. In case of a valve body 20 of metal, the closure section 30 with the seal body 36 is especially stably supported.

REFERENCE CHARACTERS

10 valve unit
20 valve body
22 longitudinal axis
24 frame
26 cutout
30 closure section
32 closure tab
34 fastening section
36 seal body
40 connection section
42 contact tab
44 fastening section
50 fastening point
52 contact region
54 through opening
56 tooth
60 positioning region
64 through opening
100 filter system
110 housing
112 filter cup
120 filter head
122 valve seat
124 fastening pin
126 base
128 contact region
130 base
134 surface plane
136 pin
140 fluid conduit

What is claimed is:
1. A valve unit comprising:
a valve seat;
a monolithic plate-shaped valve body comprising a frame, a closure section and a connection section;

wherein the monolithic plate-shaped valve body is elongated from a first axial end to an opposite second axial end;

wherein the monolithic plate-shaped valve body comprises a cutout arranged within the frame, the cutout surrounded by the frame;

wherein the closure section comprises a closure tab formed monolithically with the frame, the closure tab surrounded by the cutout except at a bending first fastening section of the closure tab which connects the closure tab monolithically to the frame such that the closure tab projects into the cutout and interacts with the valve seat by flexing of the bending first fastening section;

wherein the connection section comprises a contact tab formed monolithically with the frame, the contact tab surrounded by the cutout except at a bending second fastening section of the contact tab which connects the contact tab monolithically to the frame, such that the contact tab projects into the cutout;

wherein the connection section comprises at least one fastening point;

wherein the first fastening section and the second fastening section are arranged opposite each other at the frame along a longitudinal axis of elongation of the plate-shaped valve body.

2. The valve unit according to claim 1, wherein the at least one fastening point of the connection section is arranged on the longitudinal axis of the plate-shaped valve body.

3. The valve unit according to claim 1, wherein the at least one fastening point is a through opening.

4. The valve unit according to claim 3, wherein the through opening is a clamping element.

5. The valve unit according to claim 1, wherein the connection section comprises at least one positioning region.

6. The valve unit according to claim 5, wherein the at least one positioning region is arranged on the longitudinal axis of the monolithic plate-shaped valve body.

7. The valve unit according to claim 5, wherein the at least one positioning region is a through opening.

8. The valve unit according to claim 7, wherein the through opening extends as an elongated hole along the longitudinal axis of the monolithic plate-shaped valve body.

9. The valve unit according to claim 1, wherein the closure section comprises a seal body arranged at the closure tab or around the closure tab.

10. The valve unit according to claim 9, wherein the seal body is injection molded to the closure tab.

11. The valve unit according to claim 9, wherein the seal body is comprised of an elastomer.

12. A filter head for a valve unit according to claim 1, the filter head comprising:
a fastening pin configured to fasten the connection section of the valve unit;
a contact region configured to contact a positioning region of the valve unit.

13. The filter head according to claim 12, wherein the contact region comprises a first base contacting the positioning region of the valve unit, wherein the fastening pin comprises a second base contacting as intended the at least one fastening point of the connection section of the valve unit, wherein the first base projects farther away from a surface of the filter head than the second base, said surface of the filter head facing the valve unit as intended in a mounted state of the valve unit at the filter head.

14. The filter head according to claim 12, wherein, with the valve unit mounted as intended on the filter head and the valve seat closed, the closure tab of the closure section and the contact tab of the connecting section are deflected toward different sides of the frame of the valve unit.

15. The valve unit according to claim 1, wherein the monolithic plate-shaped valve body is formed of metal.

16. A filter system comprising:
a housing;
a filter head arranged in the housing, wherein the filter head comprises a valve seat, a fastening pin, and a contact region;
a valve unit arranged in the housing, the valve unit comprising a monolithic plate-shaped valve body comprising a frame, a closure section and a connection section,
wherein the monolithic plate-shaped valve body is elongated from a first axial end to an opposite second axial end;
wherein the monolithic plate-shaped valve body comprises a cutout arranged within the frame, the cutout surrounded by the frame,
wherein the closure section comprises a closure tab formed monolithically with the frame, the closure tab surrounded by the cutout except at a bending first fastening section of the closure tab which connects the closure tab monolithically to the frame such that the closure tab projects into the cutout and interacts with the valve seat by flexing of the bending first fastening section,
wherein the connection section comprises a contact tab formed monolithically with the frame, the contact tab surrounded by the cutout except at a bending second fastening section of the contact tab which connects the contact tab monolithically to the frame, such that the contact tab projects into the cutout,
wherein the connection section comprises at least one fastening point,
wherein the first fastening section and the second fastening section are arranged opposite each other at the frame along a longitudinal axis of elongation of the plate-shaped valve body;
wherein a seal body of the closure section of the valve unit is configured to contact a valve seat of the filter head;
wherein a seal body of the closure section of the valve unit is configured such that the seal body contacts the valve seat of the filter head;
wherein the fastening pin of the filter head is configured such that the connection section of the valve unit at the at least one fastening point is fastened to the filter head; and
wherein the contact region of the filter head is configured such that the contact region of the filter head contacts a positioning region of the valve unit.

17. The filter system according to claim 16, wherein the filter system is a prefilter for a fuel supply system.

* * * * *